(No Model.)
C. FISHER.
FISH TRAP.
No. 279,556. Patented June 19, 1883.
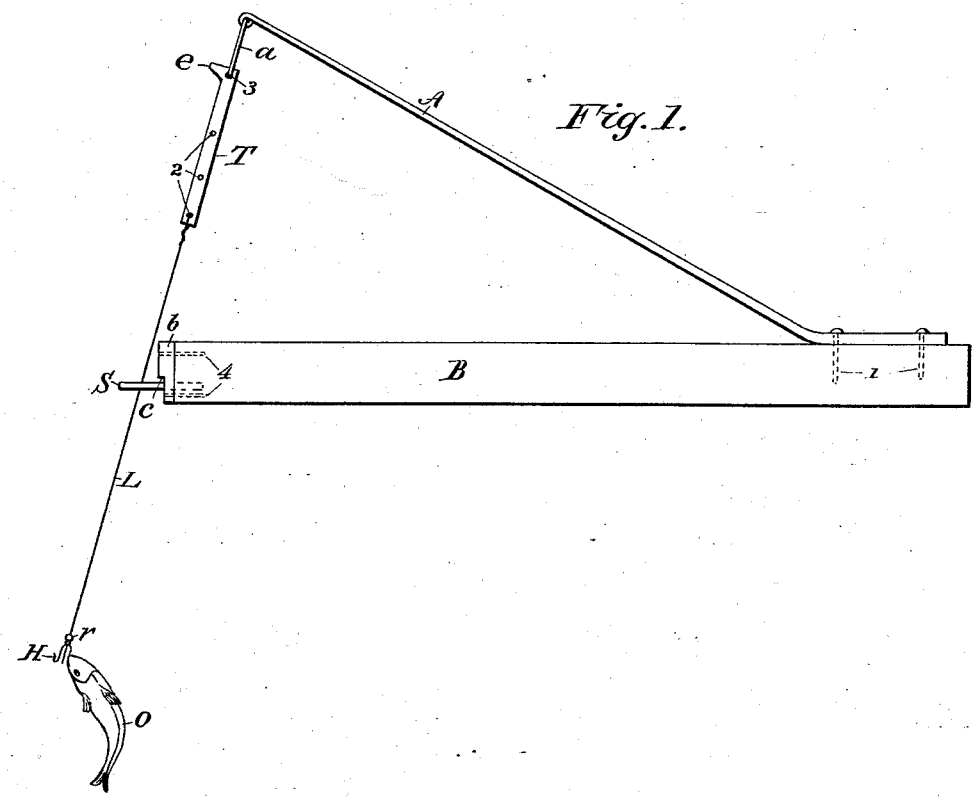
Fig. 1.
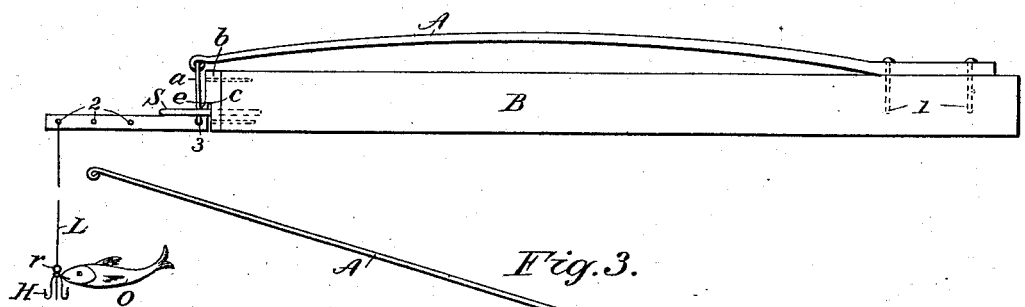
Fig. 2.
Fig. 3.
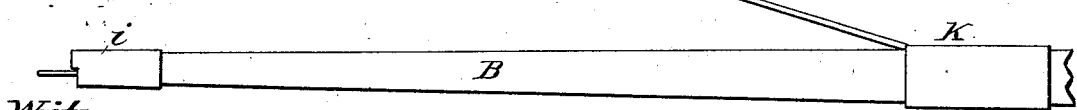
Witnesses.
F. H. Schott
A. R. Brown.
Inventor.
Cicero Fisher
by J. C. Tasker
atty

UNITED STATES PATENT OFFICE.

CICERO FISHER, OF TEMPERANCE HALL, TENNESSEE.

FISH-TRAP.

SPECIFICATION forming part of Letters Patent No. 279,556, dated June 19, 1883.

Application filed September 29, 1882. (No model.)

*To all whom it may concern:*

Be it known that I, CICERO FISHER, a citizen of the United States, residing at Temperance Hall, in the county of De Kalb and State of Tennessee, have invented a certain new and useful Improvement in Fishing-Tackle, of which the following is a specification.

The invention relates to improvements in fishing-tackle in which, by means of a spring and trigger and hooks, the fish is hung and fastened without jerking the pole by the hand; and the object of the invention is to hang the fish so quick after catching the bait that it cannot escape. The difficulty of jerking soon enough with the hand and the fact that the fish bites and then escapes so often before one can jerk and hang it with the hand suggested the invention. I attain this object by the machine illustrated in the accompanying drawings, in which—

Figure 1 represents my improved fishing device in operation. Fig. 2 is a view showing the same set; and Fig. 3 shows a portion of the device attached to a fishing-pole.

Similar letters refer to similar parts throughout the different views.

A is the spring, which is made of spring-steel or wire, as desired, attached to a wooden block, or to the pole B, by means of the screws 1 1. If a block is used, it floats on the surface of the water; if a pole, it is held in the hand.

T is the trigger, made of a piece of metal, about one-eighth inch thick and one-fourth to three-eighths inch wide, about two inches long, perforated with holes 2 2 2 at different distances from the end in which the line is tied, and the lever power increased or lessened, so as to require a lighter or heavier nibble by the fish to throw the trigger. There is also a hole, 3, in the trigger, in which is inserted a link by which the trigger is attached to the spring. This link is shown in Figs. 1 and 2 at *a*.

On the end of the block or pole is fixed a metallic plate, *b*, containing a niche, *c*, for the end *e* of the trigger. This is fastened to the block or pole by the screws or nails 4 4.

L is the line, and H the hooks, which number from eight to ten, or a single hook may be used. If more than one hook is used, they are arranged in a circular form around a central bar, to which they are fastened with thread or twine, the points projecting in every direction, so as to hang the fish in the mouth when it bites at the bait *r*.

When the spring is drawn down to be set the trigger passes through the loop or staple *s*, which is driven in the end of the block and serves as a rest for the trigger while in the niche *c*, and prevents the end where the line is tied from rising up with the spring. In Fig. 1 the trigger has been thrown and the fish *o* has been caught. In Fig. 2 the trigger is set ready for action and the fish is at the bait.

Fig. 3 represents the same machine attached to a pole, *i* being the thimble on the end of the pole, with the notch and staple ready to receive the trigger, and K another thimble, by which the spring is attached to the pole by means of the screw *m*. The same trigger and line in Figs. 1 and 2 may be attached.

Having thus described my invention, what I claim as new, and desire to secure by Letters Patent, is—

The combination, with the block or pole B, provided with loop or staple *s*, of the spring A, trigger T, link *a*, and line L, having one or more hooks, all substantially as and for the purpose described.

CICERO FISHER.

Witnesses:
 J. R. ALLISON,
 H. B. OLIVER.